US010478717B2

(12) United States Patent
Robbins et al.

(10) Patent No.: US 10,478,717 B2
(45) Date of Patent: *Nov. 19, 2019

(54) AUGMENTED REALITY AND PHYSICAL GAMES

(71) Applicant: Microsoft Technology Licensing, LLC, Redmond, WA (US)

(72) Inventors: Steven John Robbins, Bellevue, WA (US); William J. Westerinen, Issaquah, WA (US); Lisa M. Hanson, Issaquah, WA (US); Sung Ho Son, Bellevue, WA (US); Richard J. Wattles, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,653

(22) Filed: Jul. 31, 2017

(65) Prior Publication Data

US 2017/0326446 A1 Nov. 16, 2017

Related U.S. Application Data

(63) Continuation of application No. 13/440,165, filed on Apr. 5, 2012, now Pat. No. 9,717,981.

(51) Int. Cl.
*A63F 13/213* (2014.01)
*A63F 13/5375* (2014.01)
(Continued)

(52) U.S. Cl.
CPC ............ *A63F 9/24* (2013.01); *A63F 3/00643* (2013.01); *A63F 13/213* (2014.09);
(Continued)

(58) Field of Classification Search
None
See application file for complete search history.

(56) References Cited

U.S. PATENT DOCUMENTS 2,012,011 A 8/1935 Keller
3,410,774 A 11/1968 Barson et al.
(Continued)

FOREIGN PATENT DOCUMENTS

AU 2011204946 B1 12/2011
CN 1373385 A 10/2002
(Continued)

OTHER PUBLICATIONS

"Final Office Action Issued in U.S. Appl. No. 13/432,311", dated May 15, 2017, 23 Pages.
(Continued)

*Primary Examiner* — Damon J Pierce
(74) *Attorney, Agent, or Firm* — Alleman Hall Creasman & Tuttle LLP

(57) ABSTRACT

Augmented reality and physical game techniques are described. In one or more implementations, an indication is received by a computing device of a location of a physical gaming piece of a game. An augmentation is computed based on the indication by the computing device to be displayed as part of the game. The augmentation is displayed by the computing device on a display device that is at least partially transparent such that a physical portion of the game is viewable through the display device concurrently with the augmentation.

20 Claims, 8 Drawing Sheets

(51) Int. Cl.

| | | |
|---|---|---|
| *A63F 9/24* | (2006.01) | |
| *A63F 13/2145* | (2014.01) | |
| *A63F 13/52* | (2014.01) | |
| *A63F 3/00* | (2006.01) | |
| *A63F 13/537* | (2014.01) | |
| *A63F 13/53* | (2014.01) | |
| *A63F 9/06* | (2006.01) | |

(52) U.S. Cl.
CPC .......... *A63F 13/2145* (2014.09); *A63F 13/52* (2014.09); *A63F 13/5375* (2014.09); *A63F 13/53* (2014.09); *A63F 13/537* (2014.09); *A63F 2009/0615* (2013.01); *A63F 2009/0619* (2013.01); *A63F 2009/2435* (2013.01); *A63F 2009/2442* (2013.01); *A63F 2250/307* (2013.01); *A63F 2300/1075* (2013.01); *A63F 2300/1093* (2013.01); *A63F 2300/308* (2013.01); *A63F 2300/6045* (2013.01)

(56) References Cited

U.S. PATENT DOCUMENTS

| | | |
|---|---|---|
| 3,836,258 A | 9/1974 | Courten et al. |
| 3,906,528 A | 9/1975 | Johnson |
| 3,971,065 A | 7/1976 | Bayer |
| 4,711,512 A | 12/1987 | Upatnieks |
| 4,822,145 A | 4/1989 | Staelin |
| 4,860,361 A | 8/1989 | Sato et al. |
| 4,957,351 A | 9/1990 | Shioji |
| 5,019,808 A | 5/1991 | Prince et al. |
| 5,146,355 A | 9/1992 | Prince et al. |
| 5,252,950 A | 10/1993 | Saunders et al. |
| 5,309,169 A | 5/1994 | Lippert |
| 5,359,444 A | 10/1994 | Piosenka et al. |
| 5,453,877 A | 9/1995 | Gerbe et al. |
| 5,455,458 A | 10/1995 | Quon et al. |
| 5,455,601 A | 10/1995 | Ozaki |
| 5,455,882 A | 10/1995 | Veligdan |
| 5,459,611 A | 10/1995 | Bohn et al. |
| 5,483,307 A | 1/1996 | Anderson |
| 5,491,580 A | 2/1996 | O'Meara |
| 5,543,588 A | 8/1996 | Bisset et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,777,715 A | 7/1998 | Kruegle et al. |
| 5,856,842 A | 1/1999 | Tedesco |
| 5,861,931 A | 1/1999 | Gillian et al. |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,188,427 B1 | 2/2001 | Anderson et al. |
| 6,226,178 B1 | 5/2001 | Broder et al. |
| 6,239,502 B1 | 5/2001 | Grewe et al. |
| 6,264,787 B1 | 7/2001 | Burbank |
| 6,271,808 B1 | 8/2001 | Corbin |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,547,416 B2 | 4/2003 | Pashley et al. |
| 6,554,428 B2 | 4/2003 | Fergason et al. |
| 6,567,101 B1 | 5/2003 | Thomas |
| 6,577,411 B1 | 6/2003 | David |
| 6,580,529 B1 | 6/2003 | Amitai et al. |
| 6,606,152 B2 | 8/2003 | Littau et al. |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B2 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |
| 7,649,594 B2 | 1/2010 | Kim et al. |
| 7,660,500 B2 | 2/2010 | Konttinen et al. |
| 7,679,641 B2 | 3/2010 | Lipton et al. |
| 7,693,292 B1 | 4/2010 | Gross et al. |

(56) References Cited

U.S. PATENT DOCUMENTS

| | | |
|---|---|---|
| 7,701,716 B2 | 4/2010 | Blanco et al. |
| 7,719,769 B2 | 5/2010 | Sugihara et al. |
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,832,885 B2 | 11/2010 | Hsiao et al. |
| 7,843,691 B2 | 11/2010 | Reichert et al. |
| 7,868,300 B2 | 1/2011 | Kruit et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,246,170 B2 | 8/2012 | Yamamoto et al. |
| 8,274,614 B2 | 9/2012 | Yokote et al. |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,446,340 B2 | 5/2013 | Aharoni |
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,770,813 B2 | 7/2014 | Bohn et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,854,802 B2 | 10/2014 | Robinson et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 9,052,414 B2 | 6/2015 | Travis et al. |
| 9,223,138 B2 | 12/2015 | Bohn |
| 9,272,338 B2 | 3/2016 | Fujita et al. |
| 9,297,996 B2 | 3/2016 | Bohn et al. |
| 9,298,012 B2 | 3/2016 | Bohn et al. |
| 9,368,546 B2 | 6/2016 | Fleck et al. |
| 9,558,590 B2 | 1/2017 | Westerinen et al. |
| 9,578,318 B2 | 2/2017 | Fleck et al. |
| 9,581,820 B2 | 2/2017 | Robbins |
| 9,684,174 B2 | 6/2017 | Fleck et al. |
| 9,717,981 B2 | 8/2017 | Robbins et al. |
| 9,726,887 B2 | 8/2017 | Fleck et al. |
| 9,779,643 B2 | 10/2017 | Bohn et al. |
| 9,807,381 B2 | 10/2017 | Fleck et al. |
| 2001/0043208 A1 | 11/2001 | Furness et al. |
| 2002/0015110 A1 | 2/2002 | Brown Elliott |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2004/0011503 A1 | 1/2004 | Kung et al. |
| 2004/0012341 A1 | 1/2004 | Hyuga |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0179372 A1 | 8/2005 | Kawakami et al. |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2005/0285879 A1 | 12/2005 | Suzuki et al. |
| 2005/0286125 A1 | 12/2005 | Sundstrom et al. |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0119765 A1* | 6/2006 | Abileah ............ G02F 1/133615 349/86 |
| 2006/0129951 A1 | 6/2006 | Vaananen et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich et al. |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0164988 A1 | 7/2007 | Ryu et al. |
| 2007/0177260 A1 | 8/2007 | Kuppenheimer et al. |
| 2007/0236959 A1 | 10/2007 | Tolbert et al. |
| 2007/0284093 A1 | 12/2007 | Bhatti et al. |
| 2008/0007511 A1 | 1/2008 | Tsuboi et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0280682 A1 | 11/2008 | Brunner et al. |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0084757 A1 | 4/2009 | Erokhin et al. |
| 2009/0092261 A1 | 4/2009 | Bard |
| 2009/0097127 A1 | 4/2009 | Amitai |
| 2009/0115783 A1 | 5/2009 | Eichenlaub |
| 2009/0128449 A1 | 5/2009 | Brown et al. |
| 2009/0128901 A1 | 5/2009 | Tilleman et al. |

(56) References Cited

U.S. PATENT DOCUMENTS

| | | |
|---|---|---|
| 2009/0180250 A1 | 7/2009 | Holling et al. |
| 2009/0189974 A1 | 7/2009 | Deering |
| 2009/0190003 A1 | 7/2009 | Park et al. |
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2010/0002989 A1 | 1/2010 | Tokushima |
| 2010/0018858 A1 | 1/2010 | Seki |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Seesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0238664 A1 | 9/2010 | Steenbergen |
| 2010/0245387 A1 | 9/2010 | Bachelder et al. |
| 2010/0259889 A1 | 10/2010 | Chen et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0287485 A1 | 11/2010 | Bertolami et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Linden |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0053688 A1* | 3/2011 | Crawford ............... A63D 5/04 463/31 |
| 2011/0063795 A1 | 3/2011 | Yeh et al. |
| 2011/0068699 A1 | 3/2011 | Knapp |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0149201 A1 | 6/2011 | Powell et al. |
| 2011/0163986 A1 | 7/2011 | Lee et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0010487 A1 | 1/2012 | Currie et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0083325 A1 | 4/2012 | Heatherly |
| 2012/0093320 A1* | 4/2012 | Flaks ..................... H04S 7/301 381/17 |
| 2012/0102438 A1 | 4/2012 | Robinson et al. |
| 2012/0105487 A1 | 5/2012 | Son et al. |
| 2012/0106170 A1 | 5/2012 | Matthews et al. |
| 2012/0111544 A1 | 5/2012 | Senatori |
| 2012/0113092 A1 | 5/2012 | Bar-Zeev et al. |
| 2012/0127577 A1 | 5/2012 | Desserouer |
| 2012/0157114 A1 | 6/2012 | Alameh et al. |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | Mcardle et al. |
| 2012/0249797 A1 | 10/2012 | Haddick et al. |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2012/0292535 A1 | 11/2012 | Choi et al. |
| 2013/0000871 A1 | 1/2013 | Olson et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0155070 A1 | 6/2013 | Luo |
| 2013/0162673 A1 | 6/2013 | Bohn |
| 2013/0163089 A1 | 6/2013 | Bohn |
| 2013/0170031 A1 | 7/2013 | Bohn et al. |
| 2013/0186596 A1 | 7/2013 | Rubenstein et al. |
| 2013/0186598 A1 | 7/2013 | Rubenstein |
| 2013/0187943 A1 | 7/2013 | Bohn et al. |
| 2013/0201285 A1 | 8/2013 | Mao et al. |
| 2013/0207896 A1 | 8/2013 | Robinson et al. |
| 2013/0207964 A1 | 8/2013 | Fleck et al. |
| 2013/0208003 A1 | 8/2013 | Bohn et al. |
| 2013/0208362 A1 | 8/2013 | Bohn et al. |
| 2013/0208482 A1 | 8/2013 | Fleck et al. |
| 2013/0215081 A1 | 8/2013 | Levin et al. |
| 2013/0242056 A1 | 9/2013 | Fleck et al. |
| 2013/0242555 A1 | 9/2013 | Mukawa |
| 2013/0249895 A1 | 9/2013 | Westerinen et al. |
| 2013/0250431 A1 | 9/2013 | Robbins et al. |
| 2013/0252628 A1 | 9/2013 | Kuehnel |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0294030 A1 | 11/2013 | Wang et al. |

(56) References Cited

U.S. PATENT DOCUMENTS

| | | |
|---|---|---|
| 2013/0307875 A1 | 11/2013 | Anderson |
| 2013/0314793 A1 | 11/2013 | Robbins et al. |
| 2013/0322810 A1 | 12/2013 | Robbins |
| 2013/0332159 A1 | 12/2013 | Federighi et al. |
| 2013/0335671 A1 | 12/2013 | Fleck et al. |
| 2013/0342674 A1 | 12/2013 | Dixon |
| 2014/0010265 A1 | 1/2014 | Peng |
| 2014/0041827 A1 | 2/2014 | Giaimo et al. |
| 2014/0078130 A1 | 3/2014 | Uchino et al. |
| 2014/0094973 A1 | 4/2014 | Giaimo et al. |
| 2014/0104665 A1 | 4/2014 | Popovich et al. |
| 2014/0104685 A1 | 4/2014 | Bohn et al. |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0176528 A1 | 6/2014 | Robbins |
| 2014/0184699 A1 | 7/2014 | Ito et al. |
| 2014/0204455 A1 | 7/2014 | Popovich et al. |
| 2014/0240842 A1 | 8/2014 | Nguyen et al. |
| 2014/0320399 A1 | 10/2014 | Kim et al. |
| 2015/0168731 A1 | 6/2015 | Robbins |
| 2015/0227231 A1 | 8/2015 | Chen |
| 2016/0033697 A1 | 2/2016 | Sainiemi et al. |
| 2016/0035539 A1 | 2/2016 | Sainiemi et al. |
| 2016/0231570 A1 | 8/2016 | Levola et al. |
| 2016/0234485 A1 | 8/2016 | Robbins et al. |
| 2016/0282625 A1 | 9/2016 | Fleck et al. |
| 2017/0140577 A1 | 5/2017 | Westerinen et al. |
| 2017/0163977 A1 | 6/2017 | Fleck et al. |
| 2017/0301270 A1 | 10/2017 | Bohn et al. |

FOREIGN PATENT DOCUMENTS

| | | |
|---|---|---|
| CN | 1440513 A | 9/2003 |
| CN | 1714326 A | 12/2005 |
| CN | 101029968 A | 9/2007 |
| CN | 101589326 A | 11/2009 |
| CN | 201491069 U | 5/2010 |
| CN | 101881936 A | 11/2010 |
| CN | 102004315 A | 4/2011 |
| CN | 102096235 A | 6/2011 |
| CN | 102156555 A | 8/2011 |
| DE | 102007021036 A1 | 11/2008 |
| EP | 977022 A2 | 2/2000 |
| EP | 1494109 A2 | 1/2005 |
| EP | 1748370 A1 | 1/2007 |
| EP | 2065750 A2 | 6/2009 |
| EP | 2112547 A2 | 10/2009 |
| EP | 2216678 A1 | 8/2010 |
| EP | 2700987 A1 | 2/2014 |
| EP | 3018524 A1 | 5/2016 |
| JP | H02227340 A | 9/1990 |
| JP | H0422358 A | 1/1992 |
| JP | H07311303 A | 11/1995 |
| JP | H08163602 A | 6/1996 |
| JP | H08190640 A | 7/1996 |
| JP | 2000013818 A | 1/2000 |
| JP | 2000276613 A | 10/2000 |
| JP | 2001078234 A | 3/2001 |
| JP | 2002358032 A | 12/2002 |
| JP | 2002365589 A | 12/2002 |
| JP | 2003005128 A | 1/2003 |
| JP | 2004219664 A | 8/2004 |
| JP | 2005172851 A | 6/2005 |
| JP | 2005309638 A | 11/2005 |
| JP | 2006195333 A | 7/2006 |
| JP | 2006267887 A | 10/2006 |
| JP | 2006349921 A | 12/2006 |
| JP | 2008015125 A | 1/2008 |
| JP | 2008017135 A | 1/2008 |
| JP | 2008097599 A | 4/2008 |
| JP | 2008518368 A | 5/2008 |
| JP | 2009187290 A | 8/2009 |
| JP | 2010061545 A | 3/2010 |
| JP | 2012042654 A | 3/2012 |
| KR | 20090076539 A | 7/2009 |
| KR | 20110070087 A | 6/2011 |
| KR | 20120023458 A | 3/2012 |
| TW | 200846700 A | 12/2008 |
| WO | 9418595 A1 | 8/1994 |
| WO | 2001033282 A1 | 5/2001 |
| WO | 0195027 A2 | 12/2001 |
| WO | 3090611 A1 | 11/2003 |
| WO | 2006054056 A1 | 5/2006 |
| WO | 2008021504 A1 | 2/2008 |
| WO | 2009077601 A1 | 6/2009 |
| WO | 2010125337 A2 | 11/2010 |
| WO | 2011003381 A1 | 1/2011 |
| WO | 2011041466 A1 | 4/2011 |
| WO | 2011051660 A1 | 5/2011 |
| WO | 2011090455 A1 | 7/2011 |
| WO | 2011106797 A1 | 9/2011 |
| WO | 2011110728 A1 | 9/2011 |
| WO | 2011131978 A1 | 10/2011 |
| WO | 2012172295 A1 | 12/2012 |
| WO | 2013093906 A1 | 6/2013 |
| WO | 2013164665 A1 | 11/2013 |
| WO | 2014130383 A1 | 8/2014 |

OTHER PUBLICATIONS

"Non Final Office Action Issued in U.S. Appl. No. 13/432,311", dated Sep. 20, 2017, 28 Pages.

"Notice of Allowance Issued in U.S. Appl. No. 13/432,311", dated Apr. 18, 2018, 11 Pages.

"First Office Action Issued in Chinese Patent Application No. 201380017348.5", dated Jan. 14, 2016, 12 Pages.

"Second Office Action Issued in Chinese Patent Application No. 201380017348.5", dated Jun. 17, 2016, 7 Pages.

"Third Office Action Issued in Chinese Patent Application No. 201380017348.5", dated Oct. 18, 2016, 7 Pages.

"Second Written Opinion Issued in PCT Application No. PCT/US2013/061225", dated Oct. 10, 2014, 6 Pages.

"International Search Report & Written Opinion Issued in PCT Application No. PCT/US2013/076832", dated Mar. 17, 2014, 12 Pages.

"International Search Report and Written Opinion Issued in PCT Application No. PCT/US2014/016658", dated Apr. 23, 2014, 10 Pages.

"International Search Report and Written Opinion Issued in PCT Application No. PCT/US2015/014699", dated May 4, 2015, 15 Pages.

"International Search Report & Written Opinion Issued in PCT Application No. PCT/US2015/041900", dated Oct. 21, 2015, 11 Pages.

"International Search Report & Written Opinion Issued in PCT Application No. PCT/US2015/041909", dated Oct. 20, 2015, 13 Pages.

Pu, et al., "Exposure Schedule for Multiplexing Holograms in Photopolymer Films", In Journal of the Optical Engineering, vol. 35, Issue 10, Oct. 1, 1996, pp. 2824-2829.

Raghavan, et al., "Computational Sprinting", In Proceedings of the IEEE 18th International Symposium on High-Performance Computer Architecture (HPCA), Feb. 25, 2012, 12 Pages.

Raghavan, et al., "Computational Sprinting on a Hardware/Software Testbed", In Proceedings of the Eighteenth International Conference on Architectural Support for Programming Languages and Operating Systems, vol. 41, Issue 1, Mar. 16, 2013, 12 Pages.

Raghavan, et al., "Designing for Responsiveness With Computational Sprinting", In IEEE Micro Journal, vol. 33, Issue 3, May, 2013, pp. 8-15.

Scott, et al., "RearType: Text Entry Using Keys on the Back of a Device", In Proceedings of the 12th ACM Conference on Human-Computer Interaction with Mobile Devices and Services, Sep. 7, 2010, 9 Pages.

Shane, Baxtor, "TwinTech GeForce GTS 250 XT OC 1GB Graphics Card", Retrieved from <<https://web.archive.org/web/20090518014045/http://www.tweaktown.com/reviews/2733/twintech_geforce_gts_250_xt_oc_1gb_graphics_card/index3.html>>, Apr. 24, 2009, 4 Pages.

(56) References Cited

OTHER PUBLICATIONS

Stupar, et al., "Optimization of Phase Change Material Heat Sinks for Low Duty Cycle High Peak Load Power Supplies", In Proceedings of the IEEE Transactions on Components, Packaging and Manufacturing Technology, vol. 2, Issue 1, Jan. 1, 2012, 14 Pages.
Tari, et al., "CFD Analyses of a Notebook Computer Thermal Management System and a Proposed Passive Cooling Alternative", In Proceedings of the IEEE Transactions on Components and Packaging Technologies, vol. 33, Issue 2, Jun. 2010, pp. 443-452.
Travis, et al. "Collimated Light from a Waveguide for a Display Backlight", In Journal of Optics Express, vol. 17, Issue 22, Oct. 26, 2009, 6 Pages.
Travis, et al., "The Design of Backlights for View-Sequential 3D", Retrieved From: <<https://www.microsoft.com/en-us/research/publication/design-backlights-view-sequential-3d/>>, Jul. 3, 2010, 4 Pages.
Travis, et al. "Wedge Optics in Flat Panel Displays", In Proceedings of the IEEE, vol. 101, Issue 1, Jul. 14, 2011, 15 Pages.
Van, et al., "A Survey of Augmented Reality Technologies, Applications and Limitations", In Proceedings of the International Virtual Reality, vol. 9, Issue 2, Jun. 1, 2010, 19 Pages.
Walker, Tony, "Thermalright Ultra-120 Extreme CPU Cooler", Retrieved From: <<https://web.archive.org/web/20091231194530/pro-clockers.com/cooling/66-thermalright-ultra-120-extreme-cpu-cooler.html>>, Jul. 2, 2009, 7 Pages.
Wigdor, et al., "LucidTouch: A See-Through Mobile Device", In Proceedings of the 20th Annual ACM Symposium on User Interface Software and Technology, Oct. 7, 2007, 10 Pages.
Yan, et al., "Multiplexing Holograms in the Photopolymer With Equal Diffraction Efficiency", In Proceedings of the SPIE Advances in Optical Data Storage Technology, vol. 5643, Jan. 1, 2005, pp. 109-117.
Zharkova, et al., "Study of the Dynamics of Transmission Gratings Growth on Holographic Polymer-Dispersed Liquid Crystals", In Proceedings of the International Conference on Methods of Aerophysical Research, Jun. 30, 2008, 4 Pages.
"First Office Action Issued in Chinese Patent Application No. 201210567932.5", dated Aug. 14, 2014, 11 Pages.
Allen, Steven C., "ELiXIR-Solid-State Luminaire with Enhanced Light Extraction by Internal Reflection", In Journal of Display Technology, vol. 3, Issue 2, Jun. 1, 2007, pp. 155-159.
Ando, et al., "Development of Three-Dimensional Microstages Using Inclined Deep-Reactive Ion Etching", In Journal of Microelectromechanical Systems, vol. 16, Issue 3, Jun. 1, 2007, pp. 613-621.
Aron, Jacob, "Sprinting' Chips Could Push Phones to the Speed Limit", In Proceedings of the New Scientist, Issue 2852, Feb. 20, 2012, 2 Pages.
Baluja, et al., "Non-Intrusive Gaze Tracking Using Artificial Neural Networks", In Technical Report CMU-CS-94-102, School of Computer Science, Jan. 5, 1994, 14 Pages.
Barger, Walt, "COTS Cooling", Retrieved From: <<https://web.archive.org/web/20151025173626/https://www.empf.org/empfasis/2009/Oct09/cots.html>>, Oct. 1, 2009, 4 Pages.
Baudisch, et al., "Back-of-Device Interaction Allows Creating Very Small Touch Devices", In Proceedings of the SIGCHI 27th International Conference on Human Factors in Computing Systems, Apr. 4, 2009, 10 Pages.
Brar, et al., "Laser-Based Head-Tracked 3D Display Research", In Journal of Display Technology, vol. 6, Issue 10, Oct. 1, 2010, pp. 531-543.
Chen, et al., "Strategies for 3D Video With Wide Fields-of-View", In Proceedings of the IEEE Optoelectronics, vol. 148, Issue 2, Apr. 2001, pp. 85-90.
Cheng, et al., "Waveguide Displays Based on Polymer-dispersed Liquid Crystals", In SPIE Newsroom, Aug. 12, 2011, 2 Pages.
Chirgwin, Richard, "Researchers Propose 'overclock' Scheme for Mobiles—Processing at a Sprint to Overcome Tech Limitations", Retrieved From: <<https://web.archive.org/web/20160314160328/http://www.theregister.co.uk/2012/02/21/sprint_processing_for_smartphones/>>, Feb. 21, 2012, 2 Pages.
Coldewey, Devin, "Researchers Propose "Computational Sprinting"to Speed Up Chips by 1000%—But Only for a Second", Retrieved from <<https://web.archive.org/web/20160527204642/http://techcrunch.com:80/2012/02/29/researchers-propose-computational-sprinting-to-speed-up-chips-by-1000-but-only-for-a-second/>>, Feb. 29, 2012, 2 Pages.
Deagazio, David, "Selecting Display Backlighting for Portable, Handheld Devices", Retrieved From: <<http://www.electronicproducts.com/Optoelectronics/Hardware_and_Accessories/Selecting_display_backlighting_for_portable_handheld_devices.aspx>>, Jan. 12, 2012, 4 Pages.
Eadicicco, Lisa, "First Transparent Tablet Lets You Touch From Both Sides", Retrieved From: <<https://web.archive.org/web/20131227011158/http://blog.laptopmag.com/first-transparent-tablet>>, Dec. 26, 2013, 4 Pages.
Gila, et al., "First Results From a Multi-len Beam Lithography and Processing System at the University of Florida", AIP Conference Proceedings, Jun. 1, 2011, 6 Pages.
Greenemeier, Larry, "Could "Computational Sprinting" Speed Up Smart Phones without Burning Them Out?", Retrieved From: <<https://web.archive.org/web/20140719144629/http://www.scientificamerican.com/article/computational-sprinting/>>, Feb. 29, 2012, 2 Pages.
Han, et al., "Accurate Diffraction Efficiency Control for Multiplexed Volume Holographic Gratings", In Journal of the Optical Engineering, vol. 41, Issue 11, Nov. 1, 2002, pp. 2799-2802.
Hua, et al., "Engineering of Head-mounted Projective Displays", In Proceedings of the Applied Optics, vol. 39, Issue 22, Aug. 1, 2000, pp. 3814-3824.
"Non-Final Office Action Issued in U.S. Appl. No. 13/336,873", dated Apr. 9, 2015, 19 Pages.
Jacques, et al., "Polarized Light Imaging of Tissue", In Book of Lasers and Current Optical Techniques in Biology—Chapter 19, Published by Royal Society of Chemistry, Jan. 2004, pp. 591-607.
Jarvenpaa, et al., "Compact Near-To-Eye Display With Integrated Gaze Tracker", In Proceedings of the SPIE, Photonics in Multimedia II, vol. 7001, Apr. 25, 2008, 8 Pages.
Jaworski, et al., "A Novel Design of Heat Sink with PCM for Electronics Cooling", In Proceedings of the 10th International Conference on Thermal Energy Storage, vol. 31, May 31, 2006, 8 Pages.
Karp, et al., "Planar Micro-optic Solar Concentration using Multiple Imaging Lenses into a Common Slab Waveguide", In Proceedings of the SPIE, vol. 7407, Jan. 2009, 11 Pages.
Kress, et al., "Exit Pupil for Wearable See-through displays", In Proceedings of the Photonic Applications for Aerospace, Transportation, and Harsh Environment III, SPIE, vol. 8368, May 1, 2012, 8 Pages.
Krishnan, et al., "A Novel Hybrid Heat Sink Using Phase Change Materials for Transient Thermal Management of Electronics", In Proceedings of the IEEE Transactions on Components and Packaging Technologies, vol. 28, Issue 2, Jun. 2005, pp. 281-289.
Lanman, et al., "Near-Eye Light Field Displays", In Journal of ACM Transactions on Graphics, vol. 32, Issue 6, Nov. 1, 2013, 10 Pages.
Large, et al., "Parallel Optics in Waveguide Displays: a Flat Panel Autostereoscopic Display", In Journal of the Display Technology, vol. 6, Issue 10, Jun. 21, 2010, 7 Pages.
Lerner, Evan, "Penn Helps Rethink Smartphone Design With Computational Sprinting", In Penn News Release, Feb. 28, 2012, 2 Pages.
Li, et al., "Switchable Electro-optic Diffractive Lens with High Efficiency for Ophthalmic Applications", In Proceedings of the National Academy of Sciences, vol. 103, Issue 16, Apr. 18, 2006, 4 Pages.
Li, et al., "Design Optimization of Reflective Polarizers for LCD Backlight Recycling", In Journal of Display Technology, vol. 5, Issue 8, Aug. 1, 2009, pp. 335-340.
Man, et al., "IT Equipment Noise Emission Standards: Overview of New Development in the Next Edition of ISO/ECMA Standards",

(56) References Cited

OTHER PUBLICATIONS

In Proceedings of the 37th International Congress and Exposition on Noise Control Engineering, vol. 2008, Issue 3, Oct. 26, 2008, 8 Pages.
Massenot, et al., "Multiplexed Holographic Transmission Gratings Recorded in Holographic Polymer-Dispersed Liquid Crystals: Static and Dynamic Studies", In Journal of Applied Optics, vol. 44, Issue 25, Sep. 1, 2005, 8 Pages.
McMillan, Robert, "Your Future iPhone May Be Stuffed With Wax", Retrieved From: <<https://web.archive.org/web/20140424175005/https://www.wired.com/2013/08/sprinting/>>, Aug. 23, 2013, 3 Pages.
Melcher, R. L., "LCoS for High Performance Displays", In Proceedings of the IEEE 16th Annual Meeting of the Lasers and Electro-Optics Society, vol. 2, Oct. 27, 2003, pp. 812-813.
Minier, et al., "Diffraction Characteristics of Superimposed Holographic Gratings in Planar Optical Waveguides", In Proceedings of the IEEE Photonics Technology Letters, vol. 4, Issue 10, Oct. 1, 1992, pp. 1115-1118.
Moore, Nicole Casal, "Computational Sprinting Pushes Smartphones Till They're Tired", In Michigan News Release, Feb. 28, 2012, 2 Pages.
Nguyen, et al., "Advanced Cooling System Using Miniature Heat Pipes in Mobile PC", In Proceedings of IEEE Transactions on Components and Packaging Technology, vol. 23, Issue 1, Mar. 1, 2000, pp. 86-90.
Owano, Nancy, "Study Explores Computing Bursts for Smartphones", In Proceedings of the 18th Symposium on High Performance Computer Architecture (HPCA), Feb. 21, 2012, 2 Pages.
Patrizio, Andy, "Researchers Working on Ways to Put 16-Core Processors in Smartphones", Retrieved From: <<https://web.archive.org/web/20150711030453/http://www.brighthand.com/news/researchers-working-on-ways-to-put-16-core-processors-in-smartphones/>>, Mar. 18, 2012, 2 Pages.
"International Search Report and Written Opinion Issued in PCT Application No. PCT/US2012/069330", dated Mar. 28, 2013, 9 Pages.
"International Search Report and Written Opinion Issued in PCT Application No. PCT/US2012/069331", dated Mar. 29, 2013, 10 Pages.
"International Search Report and Written Opinion Issued in PCT Application No. PCT/US2012/071563", dated Apr. 25, 2013, 13 Pages.
"International Search Report and Written Opinion Issued in PCT Application No. PCT/US2013/021783", dated May 15, 2013, 9 Pages.
"International Search Report and Written Opinion Issued in PCT Application No. PCT/US2013/021784", dated Apr. 30, 2013, 9 Pages.
"International Search Report and Written Opinion Issued in PCT Application No. PCT/US2013/026200", dated Jun. 3, 2013, 9 Pages.
"International Search Report and Written Opinion Issued in PCT Application No. PCT/US2013/028477", dated Jun. 21, 2013, 11 Pages.
"International Search Report and Written Opinion Issued in PCT Application No. PCT/US2013/030632", dated Jun. 26, 2013, 10 Pages.
"International Search Report and Written Opinion Issued in PCT Application No. PCT/US2013/031111", dated Jun. 26, 2013, 11 Pages.
"International Search Report and Written Opinion Issued in PCT Application No. PCT/US2013/053676", dated Oct. 16, 2013, 10 Pages.
"International Search Report and Written Opinion Issued in PCT Application No. PCT/US2013/061225", dated Jun. 4, 2014, 12 Pages.
"Final Office Action Issued in U.S. Appl. No. 13/432,311", dated Dec. 15, 2014, 25 Pages.
"Final Office Action Issued in U.S. Appl. No. 13/432,311", dated Dec. 24, 2014, 25 Pages.
"Non Final Office Action Issued in U.S. Appl. No. 13/432,311", dated Jun. 2, 2015, 26 Pages.
"Non-Final Office Action Issued in U.S. Appl. No. 13/432,311", dated Jul. 8, 2014, 34 Pages.
"Final Office Action Issued in U.S. Appl. No. 13/432,372", dated Jan. 29, 2015, 34 Pages.
"Non-Final Office Action Issued in U.S. Appl. No. 13/432,372", dated Aug. 27, 2015, 36 Pages.
"Non-Final Office Action Issued in U.S. Appl. No. 13/432,372", dated May 9, 2014, 27 Pages.
"Non-Final Office Action Issued in U.S. Appl. No. 13/432,372", dated Oct. 24, 2014, 28 Pages.
"Final Office Action Issued in U.S. Appl. No. 13/440,165", dated Jun. 6, 2014, 13 Pages.
"Final Office Action Issued in U.S. Appl. No. 13/440,165", dated Jul. 21, 2015, 11 Pages.
"Non Final Office Action Issued in U.S. Appl. No. 13/440,165", dated Mar. 28, 2016, 13 Pages.
"Non-Final Office Action Issued in U.S. Appl. No. 13/440,165", dated Sep. 22, 2016, 13 Pages.
"Non-Final Office Action Issued in U.S. Appl. No. 13/440,165", dated Feb. 6, 2014, 13 Pages.
"Non-Final Office Action Issued in U.S. Appl. No. 13/440,165", dated Feb. 13, 2015, 10 Pages.
"Non-Final Office Action Issued in U.S. Appl. No. 13/440,165", dated Oct. 16, 2014, 12 Pages.
"Notice of Allowance Issued in U.S. Appl. No. 13/440,165", dated Mar. 23, 2017, 5 Pages.
"Final Office Action Issued in U.S. Appl. No. 13/477,646", dated Feb. 23, 2015, 36 Pages.
"Final Office Action Issued in U.S. Appl. No. 13/477,646", dated May 5, 2014, 26 Pages.
"Final Office Action Issued in U.S. Appl. No. 13/477,646", dated Nov. 24, 2015, 39 Pages.
"Non Final Office Action Issued in U.S. Appl. No. 13/477,646", dated Jun. 18, 2015, 44 Pages.
"Non-Final Office Action Issued in U.S. Appl. No. 13/477,646", dated Oct. 6, 2014, 35 Pages.
"Non-Final Office Action Issued in U.S. Appl. No. 13/477,646", dated Nov. 22, 2013, 21 Pages.
"Notice of Allowance Issued in U.S. Appl. No. 13/488,145", dated Nov. 19, 2014, 9 Pages.
"Restriction Requirement Issued in U.S. Appl. No. 13/488,145", dated Sep. 8, 2014, 14 Pages.
"Final Office Action Issued in U.S. Appl. No. 13/525,649", dated Oct. 9, 2014, 9 Pages.
"Non-Final Office Action Issued in U.S. Appl. No. 13/525,649", dated Jun. 5, 2014, 7 Pages.
"Non-Final Office Action Issued in U.S. Appl. No. 13/525,649", dated Jan. 29, 2014, 8 Pages.
"Non-Final Office Action Issued in U.S. Appl. No. 13/525,649", dated Feb. 5, 2015, 8 Pages.
"Non-Final Office Action Issued in U.S. Appl. No. 13/570,073", dated Jan. 23, 2015, 9 Pages.
"Restriction Requirement Issued in U.S. Appl. No. 13/570,073", dated Nov. 18, 2014, 7 Pages.
"Non-Final Office Action Issued in U.S. Appl. No. 13/631,308", dated Feb. 23, 2015, 10 Pages.
"Final Office Action Issued in U.S. Appl. No. 13/722,917", dated Sep. 23, 2015, 14 Pages.
"Non-Final Office Action Issued in U.S. Appl. No. 13/722,917", dated May 21, 2015, 13 Pages.
"Final Office Action Issued in U.S. Appl. No. 13/774,875", dated Jun. 4, 2015, 11 Pages.
"Non Final Office Action Issued in U.S. Appl. No. 13/774,875", dated Sep. 16, 2015, 9 Pages.
"Non-Final Office Action Issued in U.S. Appl. No. 13/774,875", dated Nov. 24, 2014, 9 Pages.
"Supplementary Search Report Issued in European Patent Application No. 13765041.2", dated Jul. 21, 2015, 3 Pages.

(56) References Cited

OTHER PUBLICATIONS

"Office Action Issued in European Patent Application No. 13769961.7", dated Jun. 30, 2015, 6 Pages.
"Office Action Issued in European Patent Application No. 13769961.7", dated Mar. 11, 2015, 8 Pages.
"Supplementary Search Report Issued in European Patent Application No. 13769961.7", dated Mar. 3, 2015, 3 Pages.
"Office Action Issued in European Patent Application No. 13770174.4", dated Mar. 11, 2015, 8 Pages.
"Office Action Issued in European Patent Application No. 13770174.4", dated Jul. 1, 2015, 6 Pages.
"Supplementary Search Report Issued in European Patent Application No. 13770174.4", dated Mar. 3, 2015, 3 Pages.
"Final Office Action Issued in U.S. Appl. No. 14/134,993", dated Aug. 20, 2014, 15 Pages.
"Final Office Action Issued in U.S. Appl. No. 14/134,993", dated Jul. 16, 2015, 19 Pages.
"Non-Final Office Action Issued in U.S. Appl. No. 14/134,993", dated Apr. 17, 2014, 34 Pages.
"Non-Final Office Action Issued in U.S. Appl. No. 14/134,993", dated Jan. 22, 2015, 17 Pages.
"Final Office Action Issued in U.S. Appl. No. 14/178,731", dated Aug. 12, 2015, 13 Pages.
"Non-Final Office Action Issued in U.S. Appl. No. 14/178,731", dated Apr. 17, 2015, 11 Pages.
"First Office Action and Search Report Issued in Chinese Patent Application No. 201210563730.3", dated Jan. 7, 2015, 16 Pages.
"BragGrate Mirror", Retrieved From: <<http://www.optigrate.com/BragGrate_Mirror.html>>, Aug. 14, 2009, 2 Pages.
"DigiLens", Retrieved From: <<http://web.archive.org/web/20120619040109/http://www.digilens.com/products.html>>, Jun. 19, 2012, 1 Page.
"HDTV Helmet Mounted Display", Retrieved From: <<http://web.archive.org/web/20150405163729/http://www.defense-update.com/products/h/HDTV-HMD.htm>>, Jan. 26, 2005, 1 Page.
"Light Guide Techniques Using LED Lamps", Retrieved From: <<http://web.archive.org/web/20161229094443/http://www-eng.lbl.gov/~shuman/XENON/REFERENCES&OTHER_MISC/Lightpipe%20design.pdf>>, Oct. 14, 2008, 22 Pages.
"Two-Faced: Transparent Phone with Dual Touch Screens", Retrieved From: <<http://web.archive.org/web/20170614133819/http://gajitz.com/two-faced-transparent-phone-with-dual-touch-screens/>>, Jun. 7, 2012, 3 Pages.
"Corrected Notice of Allowability Issued in U.S. Appl. No. 13/336,873", dated Sep. 11, 2015, 4 Pages.
"Final Office Action Issued in U.S. Appl. No. 13/336,873", dated Jan. 5, 2015, 21 Pages.
"Non-Final Office Action Issued in U.S. Appl. No. 13/336,873", dated Jul. 25, 2014, 16 Pages.
"Notice of Allowance Issued in U.S. Appl. No. 13/336,873", dated Jul. 31, 2015, 7 Pages.
"Final Office Action Issued in U.S. Appl. No. 13/336,895", dated May 27, 2014, 11 Pages.
"Non-Final Office Action Issued in U.S. Appl. No. 13/336,895", dated Oct. 24, 2013, 9 Pages.
"Notice of Allowance Issued in U.S. Appl. No. 13/336,895", dated Aug. 11, 2014, 7 Pages.
"Non-Final Office Action Issued in U.S. Appl. No. 13/343,675", dated Jul. 16, 2013, 10 Pages.
"Notice of Allowance Issued in U.S. Appl. No. 13/343,675", dated Sep. 16, 2013, 8 Pages.
"Corrected-Notice of Allowance Issued in U.S. Appl. No. 13/355,836", dated Sep. 11, 2014, 2 Pages.
"Corrected-Notice of Allowance Issued in U.S. Appl. No. 13/355,836", dated Dec. 15, 2014, 2 Pages.
"Final Office Action Issued in U.S. Appl. No. 13/355,836", dated Mar. 10, 2014, 19 Pages.
"Non-Final Office Action Issued in U.S. Appl. No. 13/355,836", dated Nov. 4, 2013, 17 Pages.
"Notice of Allowance Issued in U.S. Appl. No. 13/355,836", dated Jun. 13, 2014, 13 Pages.
"Notice of Allowance Issued in U.S. Appl. No. 13/355,836", dated Oct. 8, 2014, 13 Pages.
"Restriction Requirement Issued in U.S. Appl. No. 13/355,836", dated Sep. 27, 2013, 6 Pages.
"Final Office Action Issued in U.S. Appl. No. 13/355,914", dated Jun. 19, 2014, 11 Pages.
"Final Office Action Issued in U.S. Appl. No. 13/355,914", dated Feb. 23, 2015, 21 Pages.
"Non-Final Office Action Issued in U.S. Appl. No. 13/355,914", dated Feb. 14, 2014, 11 Pages.
"Non-Final Office Action Issued in U.S. Appl. No. 13/355,914", dated Oct. 28, 2014, 19 Pages.
"Notice of Allowance Issued in U.S. Appl. No. 13/356,545", dated Mar. 28, 2014, 6 Pages.
"Supplemental Notice of Allowalbility Issued in U.S. Appl. No. 13/356,545", dated Jul. 22, 2014, 2 Pages.
"Final Office Action Issued in U.S. Appl. No. 13/397,495", dated May 29, 2014, 10 Pages.
"Non-Final Office Action Issued in U.S. Appl. No. 13/397,495", dated Nov. 13, 2013, 8 Pages.
"Non-Final Office Action Issued in U.S. Appl. No. 13/397,495", dated Apr. 3, 2015, 11 Pages.
"Notice of Allowance Issued in U.S. Appl. No. 13/397,495", dated Oct. 20, 2015, 6 Pages.
"Final Office Action Issued in U.S. Appl. No. 13/397,516", dated Jan. 29, 2015, 13 Pages.
"Non Final Office Action Issued in U.S. Appl. No. 13/397,516", dated Sep. 24, 2015, 14 Pages.
"Non Final Office Action Issued in U.S. Appl. No. 13/397,516", dated Nov. 25, 2013, 11 Pages.
"Non Final Office Action Issued in U.S. Appl. No. 13/397,516", dated Jun. 12, 2014, 11 Pages.
"Final Office Action Issued in U.S. Appl. No. 13/397,539", dated Jun. 29, 2015, 11 Pages.
"Non Final Office Action Issued in U.S. Appl. No. 13/397,539", dated Oct. 1, 2015, 12 Pages.
"Non-Final Office Action Issued in U.S. Appl. No. 13/397,539", dated Mar. 16, 2015, 10 Pages.
"Restriction Requirement Issued in U.S. Appl. No. 13/397,539", dated Dec. 1, 2014, 6 Pages.
"Final Office Action Issued in U.S. Appl. No. 13/397,617", dated Nov. 18, 2015, 11 Pages.
"Non Final Office Action Issued in U.S. Appl. No. 13/397,617", dated May 5, 2015, 6 Pages.
"Non-Final Office Action Issued in U.S. Appl. No. 13/397,617", dated Oct. 9, 2014, 8 Pages.
"Non Final Office Action Issued in U.S. Appl. No. 13/420,388", dated Dec. 4, 2015, 7 Pages.
"Restriction Requirement Issued in U.S. Appl. No. 13/420,388", dated Aug. 13, 2015, 6 Pages.
"Advisory Action Issued in U.S. Appl. No. 13/428,879", dated Sep. 19, 2014, 4 Pages.
"Final Office Action Issued in U.S. Appl. No. 13/428,879", dated Dec. 10, 2015, 16 Pages.
"Final Office Action Issued in U.S. Appl. No. 13/428,879", dated Jul. 14, 2014, 13 Pages.
"Non Final Office Action Issued in U.S. Appl. No. 13/428,879", dated Jun. 26, 2015, 14 Pages.
"Non-Final Office Action Issued in U.S. Appl. No. 13/428,879", dated Feb. 24, 2015, 11 Pages.
"Non-Final Office Action Issued in U.S. Appl. No. 13/428,879", dated Mar. 17, 2014, 11 Pages.

* cited by examiner

US 10,478,717 B2

AUGMENTED REALITY AND PHYSICAL GAMES

CROSS REFERENCE TO RELATED APPLICATIONS

This application is a continuation of U.S. patent application Ser. No. 13/440,165, filed Apr. 5, 2012, the entire contents of which is hereby incorporated herein by reference for all purposes.

BACKGROUND

Conventional games were limited to physical objects that were moved by the players of the game. For example, users could deal playing cards, move chess pieces, roll dice, and so on. With the advent of the computing device, video games were developed in which a user interacted with an input device such as a game controller, keyboard, cursor control device (e.g., mouse), and so forth.

Although graphics involved in these games continue to improve, the user is typically divorced from the physical experience involved with conventional games. This may be at least partially responsible for the continued success of conventional games. Consequently, a divide still exists between the conventional games and video games.

SUMMARY

Augmented reality and physical game techniques are described. In one or more implementations, an indication is received by a computing device of a location of a physical gaming piece of a game. An augmentation is computed based on the indication by the computing device to be displayed as part of the game. The augmentation is displayed by the computing device on a display device that is at least partially transparent such that a physical portion of the game is viewable through the display device concurrently with the augmentation.

In one or more implementations, a gesture that was made by a user to interact with a physical game is recognized by a computing device. An augmentation is computed by the computing device based on the gesture. The augmentation is displayed by the computing device on a display device that is at least partially transparent such that a physical portion of the physical game is viewable through the display device concurrently with the augmentation.

In one or more implementations, an apparatus includes a housing configured in a hand-held form factor, a light guide, a light engine disposed within the housing and optically coupled to the light guide, and one or more modules disposed within the housing and implemented at least partially in hardware. The light guide is supported by the housing and is at least partially transparent such that at least a portion of a physical surroundings of the apparatus are viewable through the light guide. The one or more modules are configured to detect a presence of a physical game in the physical surroundings, compute an augmentation based on a current state of play of the physical game, and cause the light engine to output the augmentation for display by the light guide to be viewable concurrently with at least a portion of the physical game in the physical surroundings through the light guide.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional physical games continue to be popular for a variety of reasons. These reasons may include an ability of users to interact with physical game pieces of the board game, such as checkers, chess pieces, player representations, and so on. However, conventional physical games were often limited in the technology that was incorporated as part of the game due to cost, complexity, and other considerations.

Augmented reality game techniques are described. In one or more implementations, a computing device (e.g., a mobile phone, tablet computer, and so forth) is used to augment a physical game, such as a board game, card game, and so on. In this way, the physical game may be augmented using devices that may be readily available to a user, such as the user's mobile phone, tablet computer, and so forth, thereby reducing cost and complexity in the provision of the functionality to users. The augmentations may be provided in a variety of ways.

A user, for instance, may leverage a computing device having a mobile form factor (e.g., mobile phone, tablet, wearable computing device, and so forth) to compute and output an augmentation for display. In one example, the computing device may include a display device that is at least partially transparent such that the physical surroundings of the computing device are viewable through the display device, such as a portion of the physical game. The augmentation may also be displayed by the display device to be viewable concurrently with the portion of the physical game, such as to use auto-stereoscopic techniques to support viewing in three dimensions. Thus, the augmentation may expand a user's experience with the physical game. A variety of other examples are also contemplated as further described in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
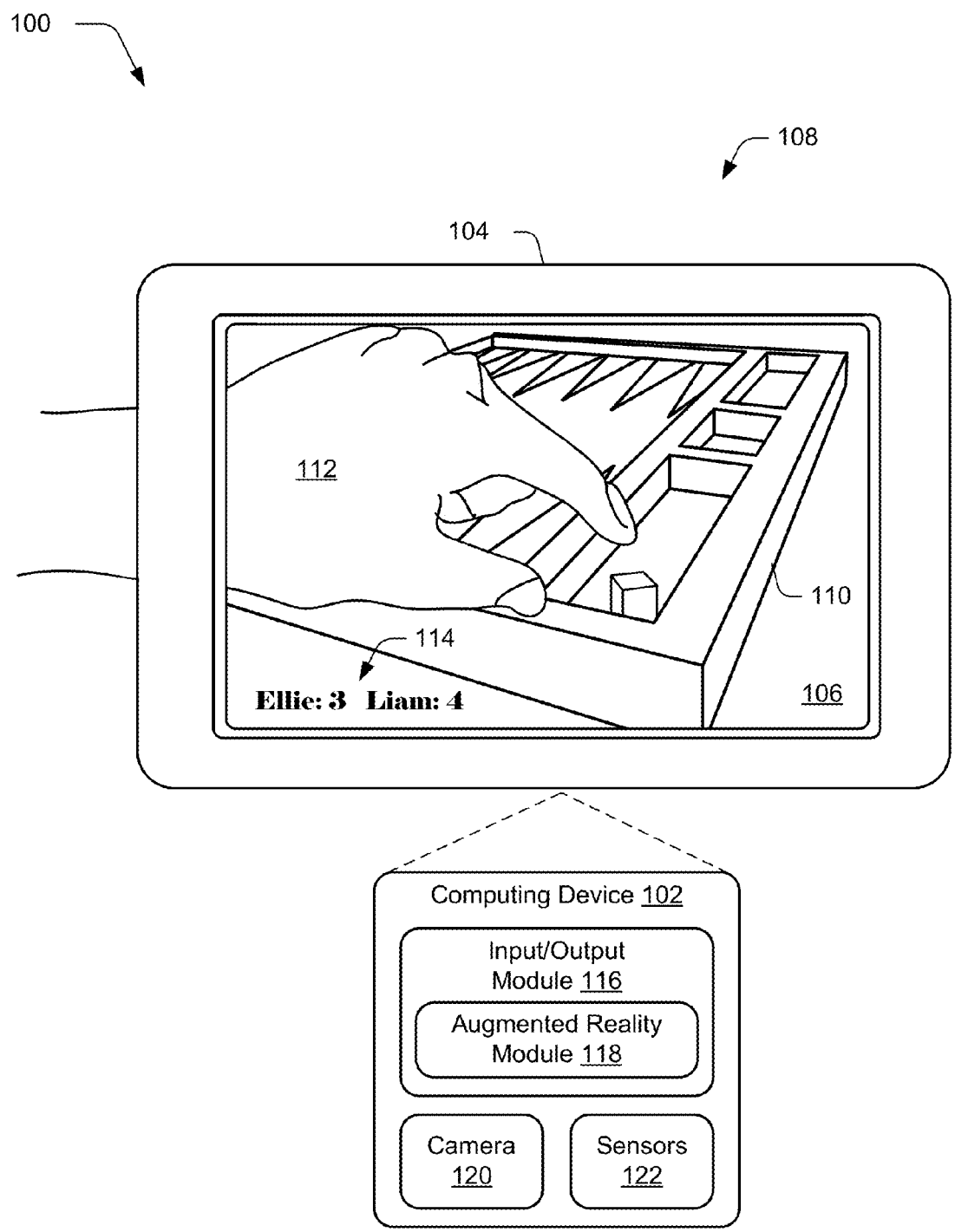
FIG. 1 is an illustration of an environment in an example implementation that is operable to employ augmented reality and physical game techniques as described herein.

FIG. 1 is an illustration of an environment 100 in an example implementation that is operable to employ the techniques described herein. The illustrated environment 100 includes a computing device 102, which may be configured in a variety of ways. For example, the computing device 102 is illustrated as employing a housing 104 that is configured in a mobile form factor. The mobile form factor, for instance, may include a tablet computer, a mobile phone, portable game device, wearable device (e.g., glasses as a display device that are wearable by a user), and so forth. However, a wide variety of other form factors are also contemplated, such as computer and television form factors as described in relation to FIG. 9.

Accordingly, the computing device 102 may range from full resource devices with substantial memory and processor resources (e.g., personal computers, game consoles) to low-resource devices with limited memory and/or processing resources (e.g., traditional televisions, net books). Additionally, although a single computing device 102 is shown, the computing device 102 may be representative of a plurality of different devices, such as a user-wearable helmet or glasses and game console, a remote control having a display and set-top box combination, and so on.

The computing device 102 is further illustrated as including a display device 106 that is at least partially transparent in this example. The transparency of the display device 106 is illustrated as allowing at least a portion of the physical surroundings 108 of the computing device 102 to be viewed through the device. In the illustrated example, the physical surroundings 108 that are viewable through the display device 106 include a part of a physical game 110 (e.g., a backgammon board) and part of a finger of the user's hand 112.

The display device 106 may also be configured to output a user interface (e.g., an augmentation 114 showing the score "Ellie: 3 Liam: 4" in the illustration) that is viewable concurrently with the portion of the physical surroundings 108. This may be used to support a variety of different functionality, such as augmented reality as further described below.

The computing device 102 also includes an input/output module 116 in this example. The input/output module 116 is representative of functionality relating to detection and processing of inputs and outputs of the computing device 102. For example, the input/output module 116 may be configured to receive inputs from a keyboard, mouse, to recognize gestures and cause operations to be performed that correspond to the gestures, and so on. The inputs may be identified by the input/output module 116 in a variety of different ways.

For example, the input/output module 116 may be configured to recognize an input received via touchscreen functionality of a display device 106, such as a finger of a user's hand as proximal to the display device 106 of the computing device 102, from a stylus, and so on. The input may take a variety of different forms, such as to recognize movement of the finger of the user's hand 108 across the display device 106, drawing of a line, and so on. Other examples include detection of a user's hand and/or finger as either touching the device or hovering above the device, which may be recognizable as separate gestures. Other examples of input would be tracking pupils and blinks of the user's eyes, movement of the computing device 102 (e.g., tilting and/or shaking), and so forth.

In implementations, these inputs may be recognized as gestures that are configured to initiate one or more operations of the computing device 102 or other device, such as to navigate through a user interface, select and/or move objects displayed in the user interface, and so on. A variety of other examples are also contemplated, such as to recognize a gesture from one or more images captured by a camera of the computing device 102 as further described below.

The input/output module 116 is also illustrated as including an augmented reality module 118. The augmented reality module 118 is representative of functionality of the computing device 102 to augment a view of the physical surroundings 108 (e.g., the "real world") of the computing device 102 using the display device 106. In the illustrated example, for instance, the computing device 102 is illustrated as being physically positioned in surroundings that include a board game (e.g., backgammon) and fingers of the user's hand 112. Thus, the augmented reality module 118 is configured to output an augmentation 114 (e.g., the score 114 of the game) to be viewed in conjunction with the physical surroundings 108.

To generate this view and know "where" to place to augmentation, the augmented reality module 118 may leverage a variety of techniques to determine an orientation and/or position of the computing device 102 in relation to the physical surroundings 108 of the device. For example, the augmented reality module 118 may leverage a camera 120 to capture images of the physical surroundings 108. The augmented reality module 118 may then process the images to locate one or more markers to determine how the computing device 102 is positioned, oriented, moved, and so on.

These markers may take a variety of forms. For instance, the augmented reality module 118 may set one or more view points in the physical surroundings 108 as markers and thus serve as a basis to determine orientation and/or positioning, such as physical game pieces of the physical game. In another instance, the augmented reality module 118 may leverage a view of one or more augmented reality (AR) tags that are physically positioned within the surrounding environment of the computing device 102. Thus, the items in the physical surroundings 108 may act as a basis to determine where the computing device 102 is located as well as how the computing device 102 is oriented.

In another example, the camera 120 may be configured to capture one or more images of a user of the computing device 102. For example, a lens of the camera 120 is illustrated in FIG. 1 as a circle disposed to the right of the display device 106 in the housing 104 as pointed toward a face of a user of the computing device 102. Images captured by the camera 120 may then be used to determine a three dimensional location of pupils of the user. In one or more implementations, the location of the pupils is calculated without calculating a vector that describes "where the eye is pointing," thereby conserving resources of the computing device 102. Other examples are also contemplated in which such a vector is calculated. In this way, the augmented reality module 118 may determine how to output the augmentation 114 for display by the display device 106.

The augmented reality module 118 may also leverage other sensors 122 to determine a position and/or orientation of the computing device 102, and more particularly a position and/or orientation of the display device 106. For example, the sensors 122 may be configured as an inertial measurement unit (IMU), which may include a gyroscope, one or more accelerometers, a magnetometer, and so on including any combination thereof. These units may be used to generate a basis with which to determine an orientation and position of the computing device 102 in relation to its physical surroundings 108.

Through one or more of these examples, the augmented reality module 118 may capture a view of the "reality" that is to be augmented, which in this instance involves a physical game that may be played by one or more users. The augmentation 114 may then be computed to be displayed at a size, orientation, and location using the display device 106.

The augmentation 114 may be configured in a variety of ways, such as for two-dimensional output, three dimensional output, and so on. For instance, the augmented reality module 118 and the display device 106 may leverage stereoscopic techniques to give a perception of depth to the augmentation, such as through auto-stereoscopy in which optics are used by the display device 106 to split an image directionally to the user's eyes. A variety of other techniques are also contemplated without departing from the spirit and scope thereof.

Further, it should be readily apparent that augmentations generated by the augmented reality module 118 may assume a variety of other forms. These forms include objects as part of a game and other changes to a view of the physical surroundings 108 of a computing device 102 through display as part of a user interface that is viewable through the display device 106. Further discussion of augmentations may be found in relation to FIG. 5.

The display device 106 may be configured in a variety of ways to support the techniques described herein, such as through configuration as a light guide that provides an output having a focal plane focused at infinity. An example of such a light guide is described beginning in relation to the following figure.

Figure 2:
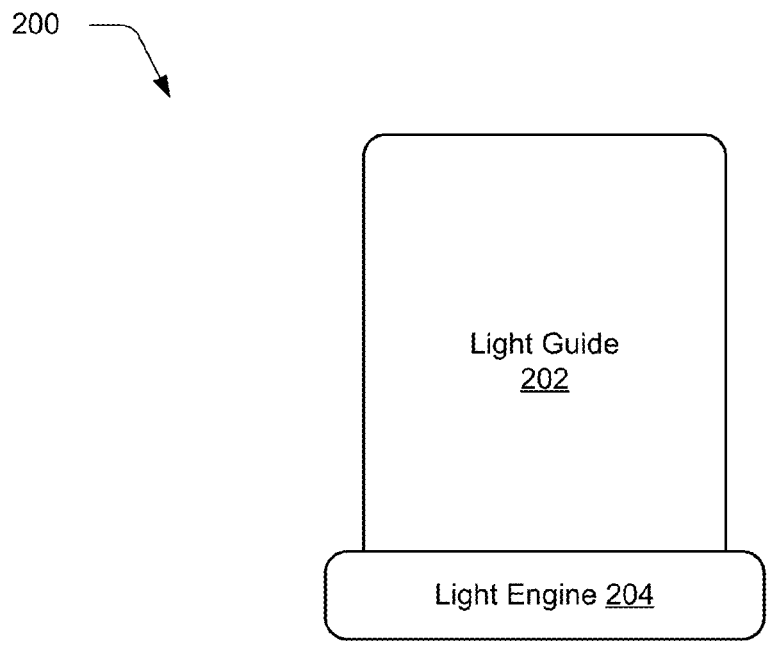
FIG. 2 depicts an example of a display device of FIG. 1 as including a light guide illustrated in a front view.

FIG. 2 depicts an example 200 of the display device 106 of FIG. 1 configured as including a light guide illustrated in a front view. The example 200 includes a light guide 202 and a light engine 204 that form the display device 106. The light guide 202 may be configured in a variety of ways, such as a piece of glass, plastic, or other optically transmittable material that serves to display an output of the light engine 204.

The light engine 204 may be configured in a variety of ways, such as a pico projector or other image output device. Examples of a light engine 204 include laser driven LCOS or LED driven scanning, an LCOS display, e.g., including RGB LEDs or lasers, and so on. The light engine 204 is optically coupled to the light guide 202 such that an output of the light engine 204 is displayed by the light guide 202 for viewing by one or more users. The light engine 204 may be optically coupled to the light guide 202 in a variety of ways, an example of which may be found in relation to the following figure.

Figure 3:
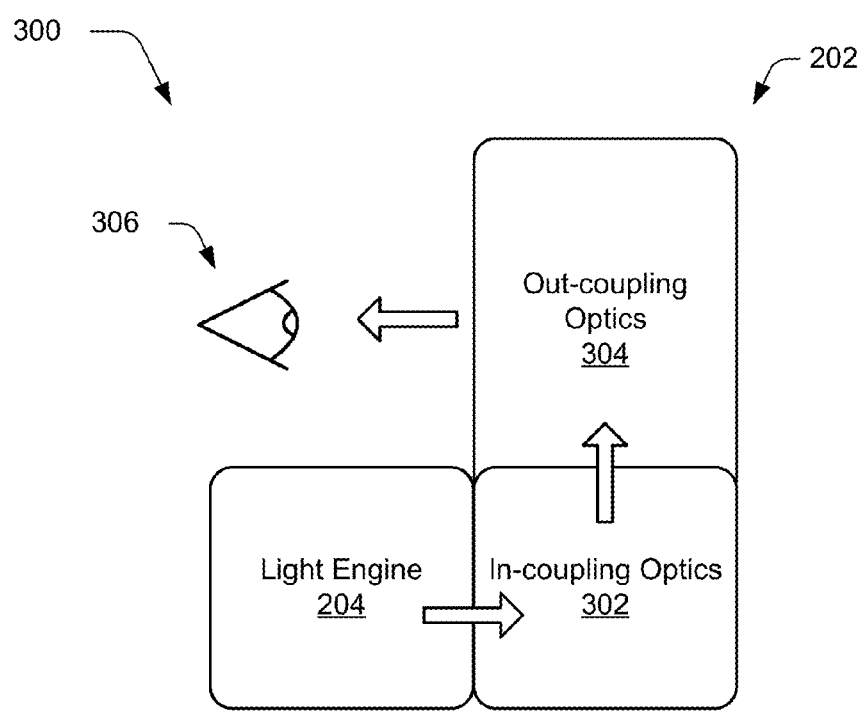
FIG. 3 depicts an example of the light guide of FIG. 2 which is shown in greater detail using a side view.

FIG. 3 depicts an example 300 of the light guide 202 of FIG. 2 which is shown in greater detail using a side view. The light guide 202 in this example is illustrated as including in-coupling optics 302 and out-coupling optics 304. The in-coupling optics 302 are configured to optically couple the light engine 204 to the light guide 202. The in-coupling optics 302 may be configured in a variety of ways, such as surface relief gratings, switchable Bragg gratings, volume holograph gratings, reflective and partially reflective surfaces, free form optical elements, wedge optics, and so forth.

In the illustrated example, the in-coupling optics 302 are configured to bend light output by the light engine 204 approximately ninety degrees for transmission to the out-coupling optics 304. Thus, the in-coupling optics 302 in this example may utilize one or more techniques to "turn light" for transmission to the out-coupling optics as described above.

Further, the in-coupling and out-coupling optics 302, 304 may be utilized as pupil expanders to expand an output from the light engine 204. The in-coupling optics 302, for instance, may be configured to expand an output of the light engine 204 horizontally. The out-coupling optics 304 may then receive this horizontally expanded output and further expand it in a vertical direction for output to the eye 306, e.g., an eye of the user of the computing device 102, such as by again utilizing one or more techniques to "turn light".

Therefore, the light engine 204 may be configured as a laser driven LCOS or LED driven scanning or LCOS display, may include RGB LEDs having a bandwidth in the range of five to ten nanometers to allow for efficient diffraction, and so forth. The light engine 204 is optically coupled to the in-coupling optics 302 of the light guide 202 utilizing one or more techniques to "turn light" as previously described. Light is then transmitted along the light guide 202 through the in-coupling optics 302 using total internal reflection (TIR) to a horizontal expansion grating. This grating serves to expand the "exit pupil" horizontally and in addition turns the light ninety degrees so it is propagating upwards in the example 300 as shown by the arrows. The light then encounters the out-coupling optics 304 which expands the "exit pupil" vertically and again turns the light as shown by the arrows so it is coupled out of the light guide 202 and towards an eye 306 of the user to view an image, e.g., a part of a user interface.

Figure 4:
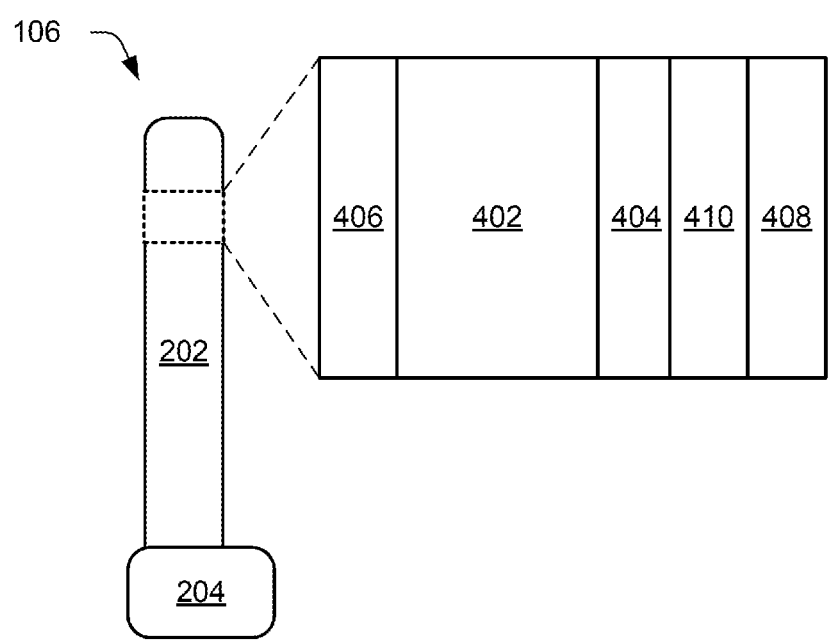
FIG. 4 depicts an example implementation of the light guide and light engine of the display device of FIG. 3 in which layers of the light guide are shown.

FIG. 4 depicts an example implementation of the light guide 202 and light engine 204 of the display device 106 in which layers of the light guide 202 are shown. The light guide 202 includes an optically transparent material 402 and diffraction grading matrix 404 that are usable to implement out-coupling optics 304 as described above in relation to FIG. 3.

The light guide 202 also includes a layer 406 to implement touch sensors across a front surface of the display device 106. The layer 406, for instance, may be configured as a grid formed using indium tin oxide (ITO) to detect X, Y coordinates of a contact, such as one or more fingers of the user's hand 108 as shown in relation to FIG. 1. Thus, this layer 406 may be used to provide inputs to the input-output module 116 which may be used to recognize one or more gestures to initiate one or more operations of the computing device 102, e.g., navigate through a user interface, launch an application, interact with a display object, and so forth.

The light guide 202 is also illustrated as including an electro-chromic layer 408 that is separated from the diffraction grading matrix 404 by an air gap 410 or lower optical index material. The electro-chromic layer 408 is operable to alternate between transparent and non-transparent states. This may be used for a variety of purposes, such as to control which part of a physical surroundings 108 of the computing device 102 are viewable through the display device 106, improve contrast for portions of a user interface displayed by the display device 106, and so on.

Thus, a display device 106 that incorporates a light guide 202 may be used to support a variety of functionality. For example, the display device 106 may support control to display an augmentation auto-stereoscopically, e.g., a different display to each eye without using dedicated eyewear. In this case, the display device 106 may provide a true overlay of objects that may be referenced for each eye. This may also be used to objects that are positioned close to the display device 106 that was not otherwise possible using conventional display devices, e.g., due to parallax for near objects whereby the angle to each eye to the object is different. Further, in the case of a display device 106 that is at least partially transparent, the portion of the physical surroundings may be viewed without redisplaying the portion, thereby conserving resources of the computing device 102.

Further, display devices 106 that incorporate a light guide 202 may offer a greater field of view than conventional display devices. For example, a field of view for a mobile device is dictated by the display size and the viewing distance. At a reasonable viewing distance of 0.5 m, the field of view of a mobile device is typically 12 degrees whereas the field of view of a light guide may be sixty degrees or greater. Thus, use of a light guide 202 by the display device 106 for gaming may be leveraged such that a typical board game of 0.5 m in size may be captured by the light guide 202 at approximately 290 millimeters away from the display device 106. Naturally, this is but one example and a variety of other examples are also contemplated.

Figure 5:
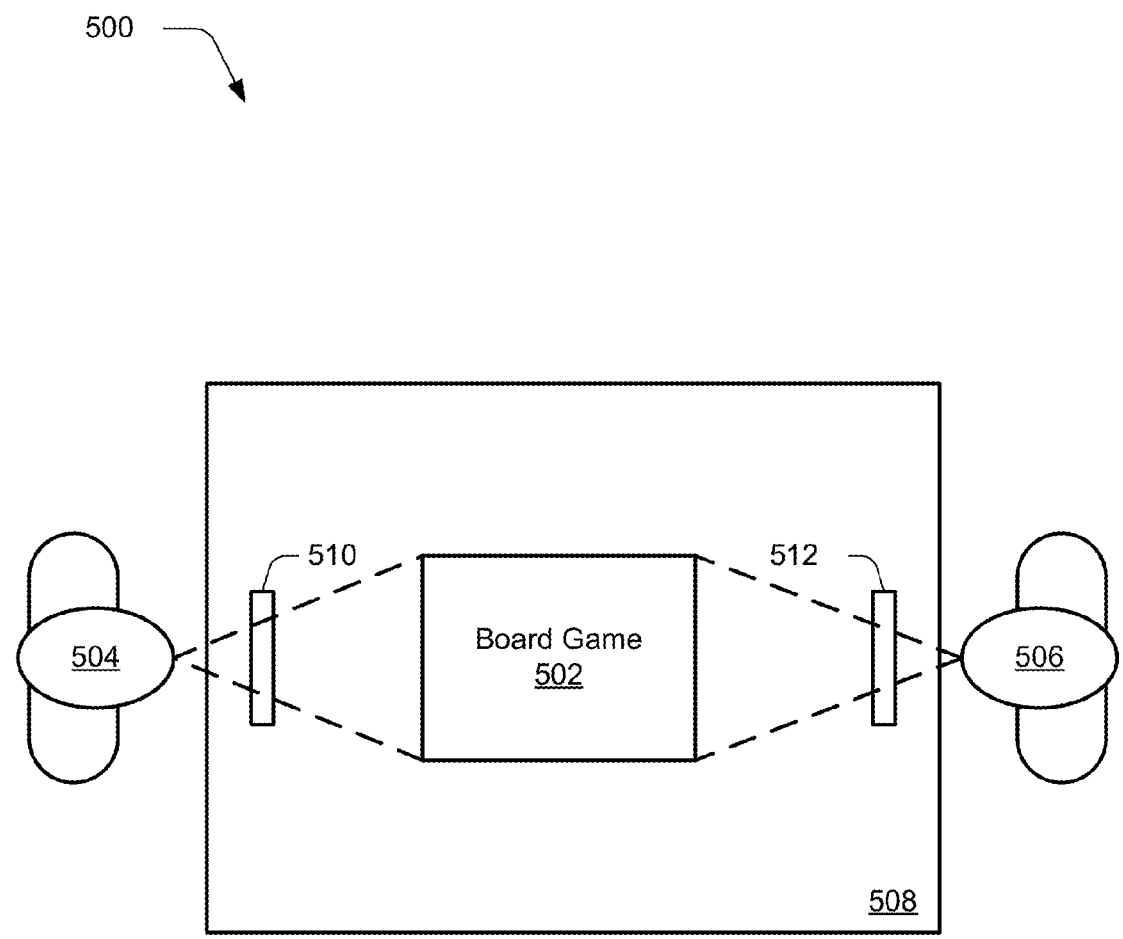
FIG. 5 depicts an example implementation of a physical game being playing in conjunction with a plurality of computing devices.

FIG. 5 depicts an example implementation 500 showing an example implementation in which a top view of a physical game is illustrated. The physical game in this instance is configured as a board game 502 that is played by first and second users 504, 506. The board game 502 is placed on a surface 508 along with computing devices 510, 512 that are viewable by the first and second user's 504, 506, respectively. The computing devices 510, 512 may be configured as previously described for computing device 102 or otherwise.

As previously described, even with the availability of video games physical games such as board games continue to be popular for a variety of reasons. These reasons include that tactile nature and support of social interaction for groups of friends and family. However, conventional physical games seldom leverage advances in technology, such as due to added cost to the game, complexity, and so forth.

However, by leveraging computing devices that may be used for other purposes, the user experience with the physical game may be expanded with minimal additional cost. Thus, the combination of a computing device that interacts with the physical game may be used to support a variety of different opportunities for enhancing the gaming experience. Furthermore with the increase in ownership of computing devices per individual such a mobile device, the potential for combining these mobile devices with physical games offers even more gaming experience opportunities. Although mobile configurations of computing devices are described, these interactions are also applicable to other display formats such as monitors and large area screens as further described in relation to FIG. 9.

The computing device 510, 512 may be leveraged to support direct and indirect interaction on the part of the respective first and second users 504, 506. For example, indirect interaction may be used in which the computing devices 510, 512 are made aware of the physical game pieces and board by inputs provided by one of the first and second users 504, 506. The computing device 102, for instance, may output instructions via a user interface that notifies the first or second user 405, 406 to perform an action. In another instance, the first and second users 504, 506 may provide inputs that describe actions made by the users, e.g., a roll of a die, movement of a player representation, and so on.

Direct interaction, on the other hand, may be used by the computing device 102 to automatically detect one or more actions without receiving manual inputs from a user. The computing device 102, for instance, may utilize the camera 120 or other sensors (e.g., sensors on the board of the board game 502) to detect actions and respond accordingly.

Regardless of whether indirect or direct interaction is supported, as previously described the availability of computing devices (e.g., mobile devices such as mobile phones and tablets) to users may be leverage to expand a user's experience with the physical game, such as the board game 502. This may include leveraging processing and display functionality that is local to the computing devices 510, 512 as well as network connections, such as to access functionality available from a web platform.

The computing devices 510, 512, for instance, may include forward looking cameras that are positioned to capture images of the physical game pieces of the game, such as a board, pieces moved across the board, and so on. These images may be used by the computing device to display a variety of different augmentations. These may include augmentations that describe a current state of a game (e.g., score, process, and so on), augmentations to be displayed as part of game play (e.g., animations), displayed to replace a view of one or more of the game pieces, and so on. An example of an augmentation is described in relation to the following figure.

Figure 6:
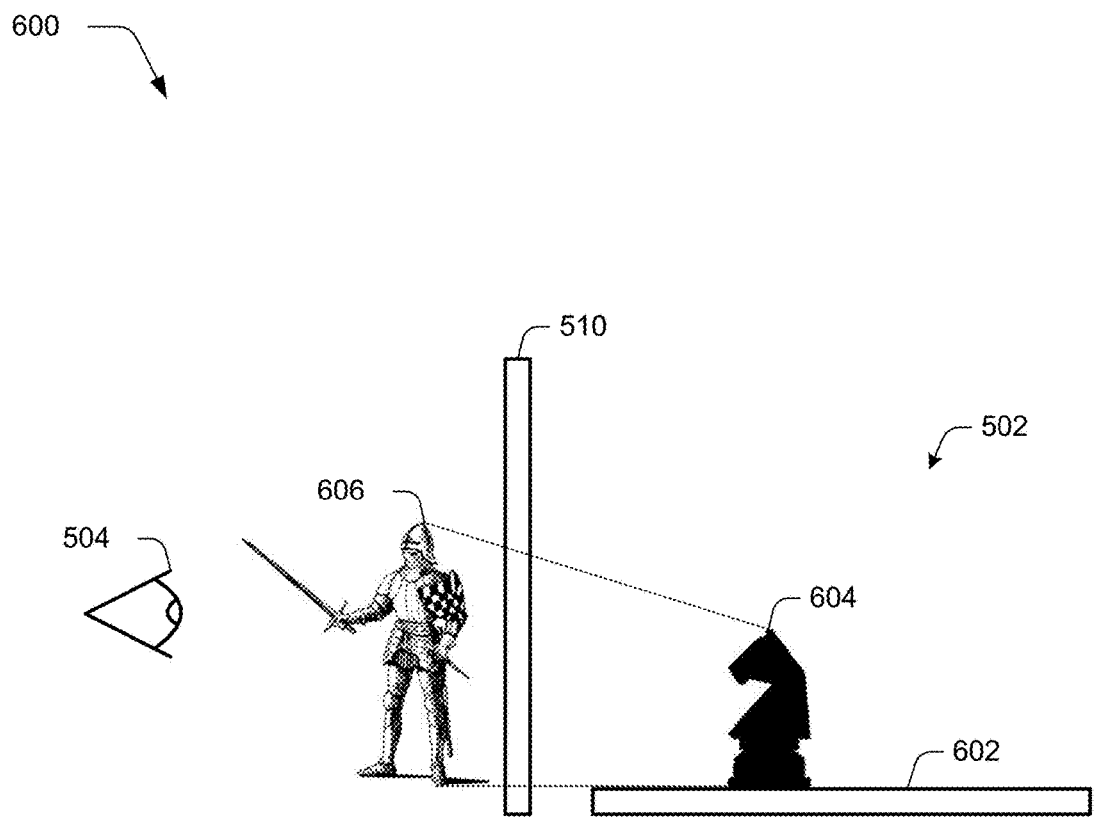
FIG. 6 depicts an example implementation showing use of a computing device by the first user of FIG. 5 as part of playing a board game.

FIG. 6 depicts an example implementation 600 showing use of the computing device 510 by the first user 504 as part of playing the board game 502. In this example, the board game 502 is configured as a chess game having physical game pieces that include a board 602 and a knight 604. The computing device 102 this instance may compute an augmentation 606 to replace an actual view of the knight 604 with a richer version that is viewable by the first user 504.

Thus, in this example the actual physical game piece (e.g., the knight 604) is not viewable by the user directly. Rather, the augmentation 606 is viewed by the first user 504, instead. A variety of augmentations are contemplated, such as animations, augmentations of the board (e.g., enumeration of different zones), descriptions of a current state of play of a game, instructions to be performed by a user (e.g., to move a physical game piece), and so forth.

Further, the augmentations may be computed in a variety of ways to support a variety of different interaction. Returning again to FIG. 5, the computing device 510, 512 may be used to display different augmentations to the respective first and second users 504, 506. This may include augmentations describing actions that are available to the players, game of skill that are performed through interaction with the computing devices 510, 512 (e.g., gestures detected by the devices), and so forth.

Further, the computing device 504 may support communication with another computing device to implement the game. This may include communicating with the other computing device 512 that is used by another player, one or more servers of a server farm that implements functionality of the game (e.g., compute augmentations and other aspects by a web service), and so on.

As previously described in relation to FIG. 1, the computing device may determine "where" and "how" to display the augmentation in a variety of ways. In one such example, feature-based tracking may be used such as "Simultaneous, Localization and Mapping' (SLaM) algorithms that locate scene features such as edges of buildings and corners of rooms and so on from images captured by the camera 120. These images may then be correlated from frame to frame to establish the 3-D geometry of the physical surroundings by movements of the camera 120 relative to the surroundings. In another example, this may be performed using a depth-sensing cameras, e.g., two cameras of known displacement employing parallax similar to human vision.

Further, if the size of the object (e.g., the knight 604) that it is being located is known by the augmented reality module 118, then the location and orientation of those objects may be established by a single camera without relative movement. For instance, this technique may be leveraged in the case of the board game in which the sizes of the board and other game pieces are known. Furthermore, features on the board and pieces may be established as tags, thereby making it easier for the recognition algorithms to work. These features may take a variety of forms, such as simple to complex geometric shapes.

If more than one computing device is used to play the game, such as computing devices 510, 512 in the example of FIG. 5, images captured by the different cameras can be leveraged, such as to overcome obscuration of one piece over another. In another example, transparent game pieces may be leveraged to mitigate obscuration of one physical game piece by another.

A user may interact with the computing devices 510, 512 in a variety of ways. This may include physical interaction with the computing devices 510, 512, such as to interact with an input device, recognition of one or more gestures using touchscreen functionality, and so on. In another example, the computing devices 510, 512 may leverage cameras to detect gestures. The computing devices 510, 512, for instance, may include cameras that are configured to capture images of physical game pieces.

Therefore, a user's interaction with a game piece may be recognized as a gesture and initiate a corresponding operation of the computing device 510, 512. In another instance, a rearward facing camera (e.g., a camera that is positioned on a same side as an intended viewing direction of the display device 106) may be used to capture gestures made by a user. Thus, gestures may be carried out in front of the display or behind the display to interact with the game. Gestures may be used to initiate a variety of different operations, such as to select game pieces, provide instructions, and so forth, further discussion of which may be found in relation to FIG. 8.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment and examples of FIGS. 1-6.

Figure 7:
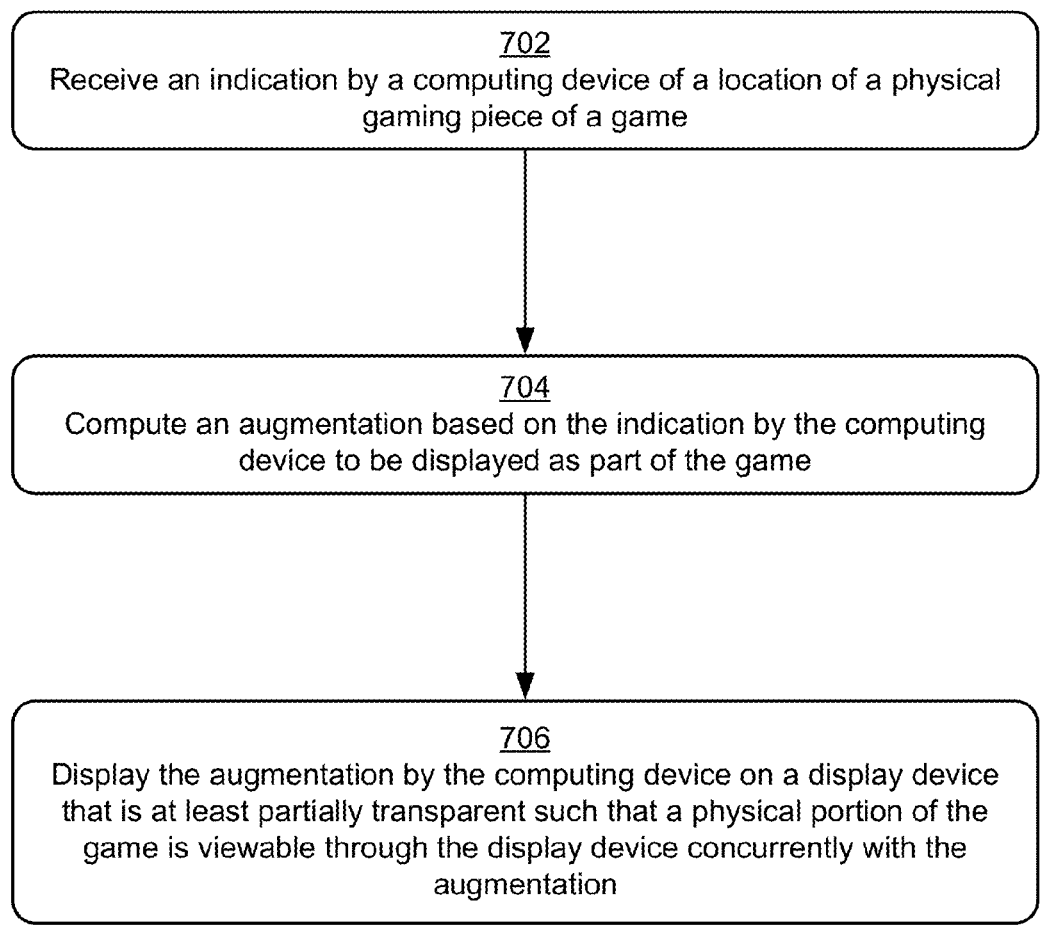
FIG. 7 is a flow diagram depicting a procedure in an example implementation in which an augmentation is computed based on an indication of a location of a physical gaming piece of a game.

FIG. 7 depicts a procedure 700 in an example implementation in which an augmentation is computed based on an indication of a location of a physical gaming piece of a game. An indication is received by a computing device of a location of a physical gaming piece of a game (block 702). The indication, for instance, may originate from one or more sensors of the physical game itself, such as a game board, a game piece representing an item (e.g., a user, checker, chess piece), and so on. In another instance, the indication may originate from one or more sensors of the computing device 102 itself, such as images captured using a camera. In a further instance, indirect interaction techniques may be supported, such as an input provided by a user through interaction with an input device such as a keyboard, cursor control device, gesture or so on that describes the location of the game piece, e.g., a coordinate on a game board.

An augmentation is computed, based on the indication by the computing device, to be displayed as part of the game (block 704). The augmentation, for instance, may be configured to replace at least a portion of a user's view of a game piece, such as to replace a portion of a game board, a game piece that is configured to be moved during game play (e.g., a check, chess piece), and so forth. In another example, the augmentation may be computed to describe a current state of gameplay. For instance, the augmentation may be configured to output a score, list available moves, instructions on how to play, instructions to be performed by a user, and so forth.

The augmentation is displayed by the computing device on a display device that is at least partially transparent such that a physical portion of the game is viewable through the display device concurrently with the augmentation (block 706). The display device 106, for instance, may be configured to include a light guide 202.

The light guide 202 as shown in FIG. 1 may be configured to allow a portion of the physical surroundings 108 of the computing device 102 to be viewed through the display device 106 along with an augmentation 114. Thus, the light guide 202 may be used to improve efficiency in processing by the computing device by avoiding rendering of the physical surroundings by the display device 106. A variety of other functionality is also made available through use of the light guide 202, such as to reduce eyestrain, improve field of view, support auto-stereoscopic techniques to provide three dimensional viewing, and so forth.

Figure 8:
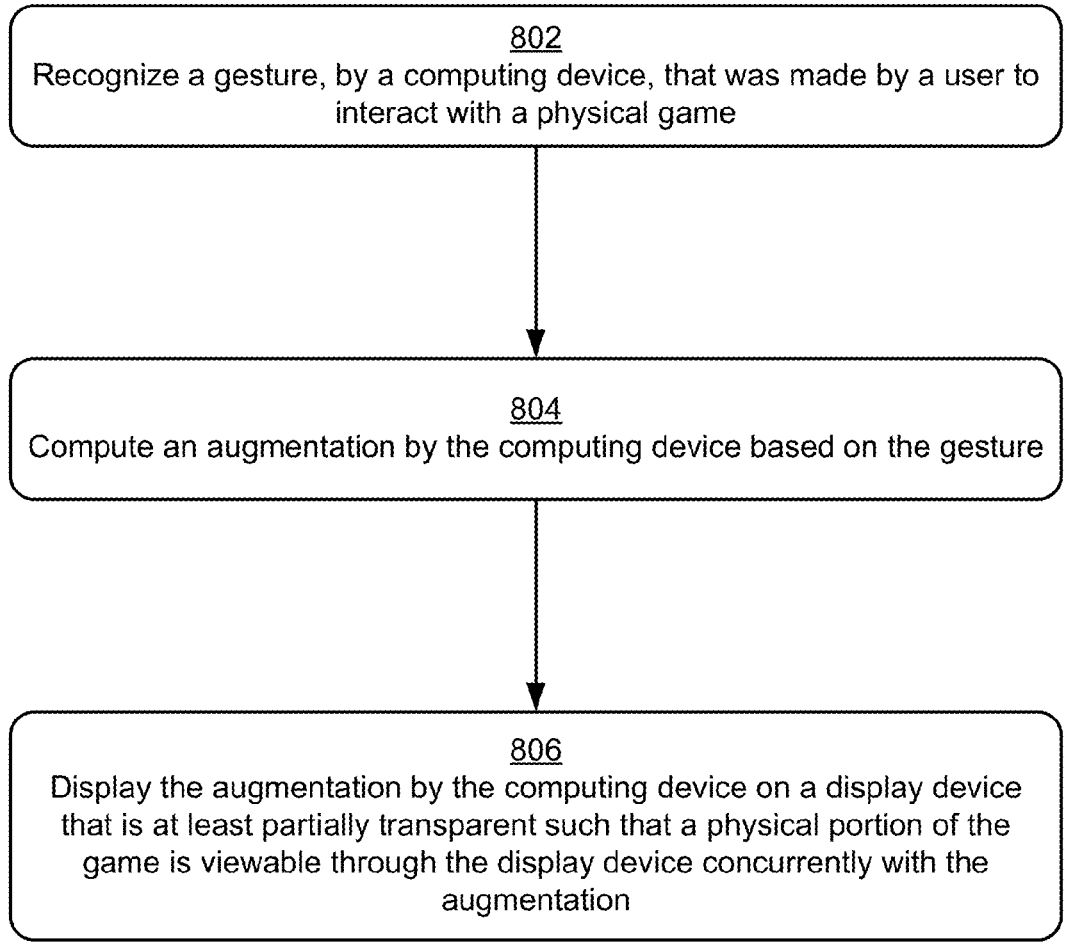
FIG. 8 is a flow diagram depicting a procedure in an example implementation in which an augmentation is computed based on a gesture input as part of a game.

FIG. 8 depicts a procedure 800 in an example implementation in which an augmentation is computed based on a gesture input as part of a game. A gesture that was made by a user to interact with a physical game is recognized by a computing device (block 802). The gesture, for instance, may be detected in a variety of ways. In one instance, the gesture is detected using touchscreen functionality of the display device 106. In another instance, one or more cameras may be utilized to capture images which are usable to recognize the gesture, such as one or more depth sensing cameras.

The gesture may also be recognized by the computing device 102 as involving one or more of the physical game pieces of the physical game. This may include a particular movement of a gaming piece to indicate an action, roll of dice, movement of a stylus, and so on. Thus, through use of the physical game pieces the number of richness of the gestures supported by the computing device 102 may be increased, such as to recognize different gestures from similar movements but involving different game pieces.

An augmentation is computed by the computing device based on the gesture (block 804). The augmentation, for instance, may be computed based on an operation to be performed that was indicated by the gesture. As previously described, the augmentation may also be configured in a variety of ways, such as to replace part of a view of the physical surroundings, indicate a current state of game play, involve an animation, and so forth. Thus, the gesture may cause the computing device to generate a variety of different augmentations.

The augmentation is displayed by the computing device on a display device that is at least partially transparent such that a physical portion of the physical game is viewable through the display device concurrently with the augmentation (block 806). For instance, the computing device 102 may be configured to employ a light guide 202 to support transparent viewing of the physical surroundings 108 as previously described. Although use of a mobile form factor was described, a variety of other form factors may leverage the techniques described herein without departing from the spirit and scope thereof.

Example System and Device

Figure 9:
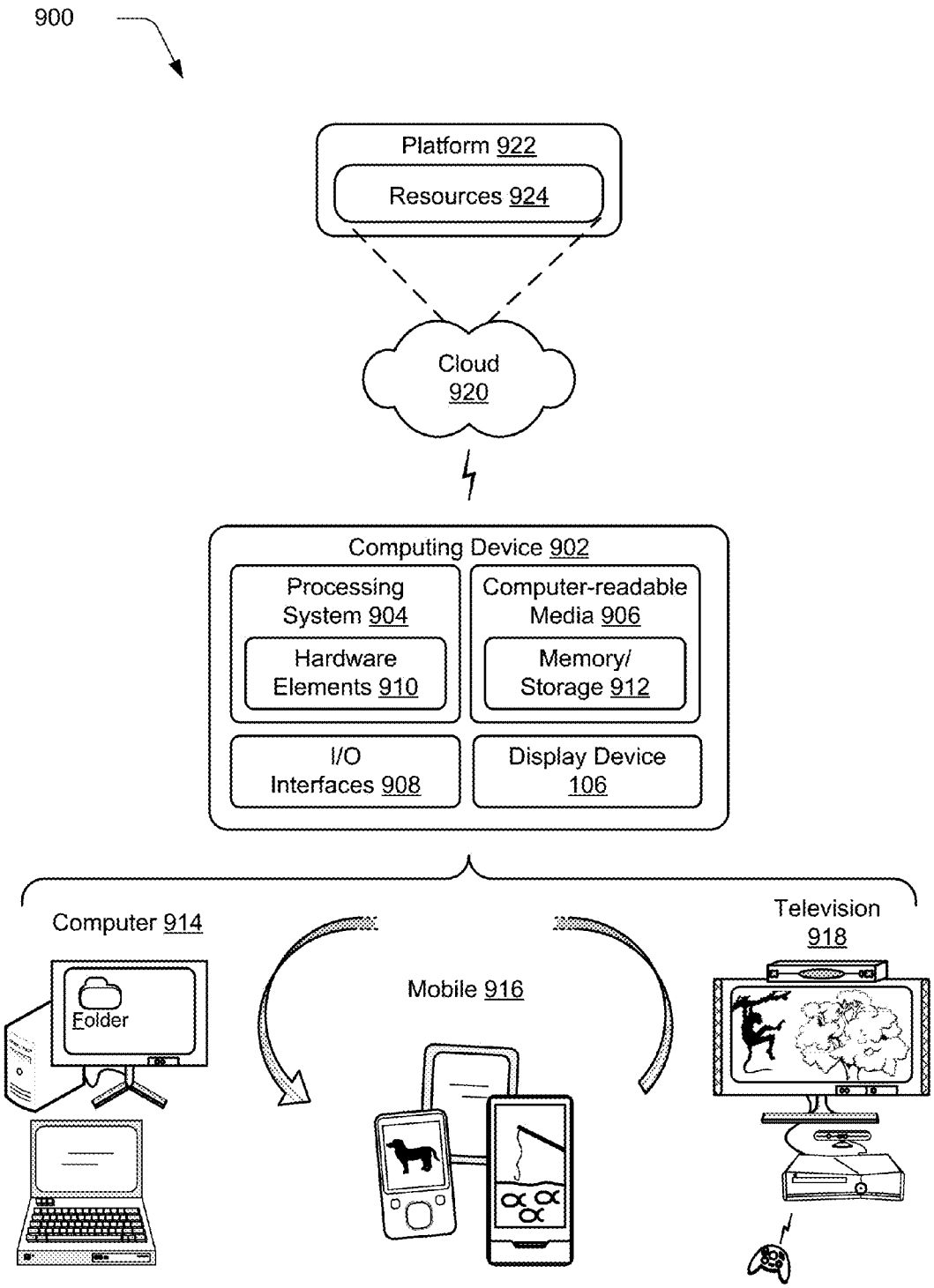
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. The computing device 902 may be, for example, a server of a service provider, a device associated with a client (e.g., a client device), an on-chip system, and/or any other suitable computing device or computing system. Further, the computing device 902 includes a display device 106 as previously described, which may incorporate a light guide 202 and light engine 204 as further detailed in relation to FIG. 2.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. Thus, the augmented reality module 118 of FIG. 1 may be implemented on a single computing device 102 as shown in FIG. 1, multiple computing devices 510, 512 as shown in FIG. 5, and may also leverage functionality of a platform 922 as further described below. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes and accordingly the display device 106 may also be configured to accommodate these different configurations. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:

1. An apparatus comprising:
a light engine;
a light guide configured to receive light from the light engine, the light guide being at least partially transparent such that at least a portion of physical surroundings of the apparatus are viewable through the light guide; and
one or more modules implemented at least partially in hardware, the one or more modules being configured to detect a presence of a physical game in the physical surroundings, compute an augmentation based at least partially on one or more available moves for a physical game piece in a current state of play of the physical game, and cause the light engine to output the augmentation for display by the light guide.

2. The apparatus of claim 1, where the one or more modules comprises one or more of a touch sensor, a camera, a keyboard, a cursor, a gyroscope, an accelerometer, and a magnetometer.

3. The apparatus of claim 1, wherein the one or more modules are configured to detect the presence of the physical game via a manual interaction.

4. The apparatus of claim 1, wherein the one or more modules are configured to recognize a gesture made by a user and compute the augmentation based at least in part on the gesture recognized.

5. The apparatus of claim 4, wherein the one or more modules are configured to recognize a gesture comprising an eye movement.

6. The apparatus of claim 1, wherein the one or modules are configured to locate one or more markers in the physical surroundings to determine an orientation and a position of the apparatus.

7. The apparatus of claim 1, wherein the one or more modules are further configured to output one or more of an augmentation describing the current state of play of the physical game and an augmentation comprising instructions related to the current state of play of the physical game.

8. The apparatus of claim 1, wherein the apparatus comprises a tablet, a mobile phone, or a wearable device.

9. The apparatus of claim 1, wherein the one or more modules are configured to receive data communicated from another apparatus, the data usable to compute the augmentation.

10. The apparatus of claim 1, wherein the one or more modules are further configured to output the augmentation using auto-stereoscopic techniques.

11. The apparatus of claim 1, wherein the light guide comprises:
a layer to implement touch sensors across a front surface of the display;
a layer of an optically transparent material;
a diffraction grating matrix;
a layer of a material of a lower optical index than the diffraction grating matrix; and
an electro-chromic layer.

12. A method comprising:
receiving an input to a computing device of a current state of play of a physical game;
computing an augmentation based on the input and one or more available moves for a physical game piece in the current state of play of the physical game, the augmentation to be displayed as part of the physical game; and
displaying the augmentation by the computing device on a display device that is at least partially transparent such that a physical portion of the game is viewable through the display device concurrently with the augmentation.

13. The method of claim 12, wherein the input comprises one or more of a manual interaction of a user with the computing device and a gesture recognized by the computing device.

14. The method of claim 13, wherein the manual interaction comprises one or more of a touch input, a cursor movement, a keystroke, and a voice command and the gesture comprises one or more of a pupil dilation, an eye movement, and a hand motion of one or more user.

15. The method of claim 12, wherein the current state of play comprises a score in the physical game.

16. The method of claim 12, wherein the input is received by one or more of a camera, a touchscreen, and a keyboard.

17. A method for displaying an augmentation, the method performed on a computing device by one or more modules implemented at least partially in hardware, the method comprising:
detecting features of a physical surroundings of an apparatus via image data received from a camera;
computing a geometry of the physical surroundings based upon the features detected;
detecting a presence of a physical game in the physical surroundings from the geometry of the physical surroundings;
computing the augmentation based at least partially on one or more available moves for a physical game piece in a current state of play of the physical game; and
outputting the augmentation for display via a display device in a location and a position based upon one or more of the features, the geometry, and the physical game detected in the physical surroundings.

18. The method of claim 17, wherein detecting the features comprises capturing images of one the physical surroundings via the camera and computing a location of one or more of an edge, a corner and a placement of an object in the images.

19. The method of claim 17, wherein detecting the features comprises using a depth camera.

20. The method of claim 17, wherein detecting the presence of the physical game comprises detecting the presence based upon a known size and a known shape of the physical game.

* * * * *